United States Patent
Quast

(10) Patent No.: US 7,185,343 B1
(45) Date of Patent: Feb. 27, 2007

(54) PROGRAM FLOW METHOD AND METHOD FOR EXPANDING A PROGRAM COMPONENT SYSTEM

(75) Inventor: Norbert W. Quast, Friesenhaben (DE)

(73) Assignee: ACOS International Limited, Dublin (IE)

( * ) Notice: Subject to any disclaimer, the term of this patent is extended or adjusted under 35 U.S.C. 154(b) by 0 days.

(21) Appl. No.: 09/582,771

(22) PCT Filed: Dec. 29, 1998

(86) PCT No.: PCT/EP98/08507

§ 371 (c)(1),
(2), (4) Date: Aug. 29, 2000

(87) PCT Pub. No.: WO99/35571

PCT Pub. Date: Jul. 15, 1999

(30) Foreign Application Priority Data

Jan. 2, 1998 (DE) .................... 198 00 102
Feb. 20, 1998 (DE) .................... 198 07 191

(51) Int. Cl.
G06F 9/14 (2006.01)
(52) U.S. Cl. ............... 719/315; 717/114; 717/120
(58) Field of Classification Search ................ 709/3; 717/3, 107, 114, 120; 719/310, 328
See application file for complete search history.

(56) References Cited

U.S. PATENT DOCUMENTS

| | | | |
|---|---|---|---|
| 5,491,808 A * | 2/1996 | Geist, Jr. ................ 711/100 |
| 5,634,124 A | 5/1997 | Khoyi et al. |
| 5,809,564 A * | 9/1998 | Craze et al. ................ 711/208 |
| 6,182,154 B1 * | 1/2001 | Campagnoni et al. ...... 709/315 |
| 6,321,273 B1 * | 11/2001 | Schofield .................... 719/315 |
| 6,397,384 B1 * | 5/2002 | Briggs ........................ 717/165 |
| 6,425,017 B1 * | 7/2002 | Dievendorff et al. ....... 709/315 |
| 6,438,573 B1 * | 8/2002 | Nilsen ........................ 718/100 |
| 6,438,744 B2 * | 8/2002 | Toutonghi et al. .......... 717/137 |
| 6,473,768 B1 * | 10/2002 | Srivastava et al. .......... 707/101 |

FOREIGN PATENT DOCUMENTS

WO    WO95/29440    11/1995

OTHER PUBLICATIONS

Purtilo, J.M. and Atlee, J.M., "Improving Module Reuse by Interface Adaption," 1990 International Conference on Computer Language, IEEE Computer Society Process (Maryland, United States), (1990).

* cited by examiner

*Primary Examiner*—William Thomson
*Assistant Examiner*—Phuong N. Hoang
(74) *Attorney, Agent, or Firm*—Thorp Reed & Armstrong, LLP

(57) ABSTRACT

A program flow method in a program component system, comprising a running time system and several components each having one program portion, the method comprising the following steps during the execution of the program portion of a first component: data acquisition by means of the running time system, of data of a second component into the first component independent of program-defined interfaces in the second component; and data disposal by means of the running time system of data of the first component into the second component independent of program-defined interfaces in the second component.

15 Claims, 4 Drawing Sheets

PROGRAM FLOW METHOD AND METHOD FOR EXPANDING A PROGRAM COMPONENT SYSTEM

BACKGROUND OF THE INVENTION

The invention relates to program flow as well as to establishing a program component system also referred to as "Component Ware". In particular, the invention relates to a program flow method in a program component system as well as a method for expanding such system.

In the article "Componentenware-von der Komponente zur Applikation" (Component ware—from component to application) by Michael Stal, published in the magazine OBJEKTspektrum, vol. 3, 1987, pages 86–89, the basics of program component systems are described. It is aimed at replacing the very time consuming software production which has been required until now, by simply "wiring" given components. These components are supposed to be applicable in different contexts without requiring the component producer to disclose details of the source code a component is based on.

For producing component ware several mutually supplementary technologies are known such as distribution platforms, container platforms and the composite documents technology.

In distribution platforms, conventions and tools for distributing components beyond computer boundaries and for communicating between the components are provided. The following distribution platforms have become quasi industrial standards: DCOM (Distributed Component Object Model) by Microsoft, CORBA (Common Object Request Broker Architecture) by OMG (Object Management Group), JAVA-RMI (Remote Method Invocation) by JavaSoft.

Container platforms include a solution-oriented set of software components at least partially covering a predetermined field of problems and tasks (such as stockkeeping, accounting, . . . ) and a solution neutral middleware (such as a graphical user interface) to permit an interaction between the components and the user.

The composite documents technology provides for integrating different applications. A composite document comprises several components (such as tables, graphics, texts, . . . ) with one application being responsible for each of them. Known architectures for composite documents are for example ActiveX by Microsoft, OpenDoc by CILab and Java Beans by JavaSoft.

However, the available methods have the problem that the functionality of a component can only and exclusively be used via interfaces predefined by the component manufacturer. In particular, these interfaces are the methods or parameters predefined by the component manufacturer. As the source code is generally not available, there is no way to expand the functionality of a component independently of the component manufacturer. A mere possibility for parametrization which may be provided, does not constitute an expansion of the functionality of a component, as all possible functions already have to be provided originally by the component manufacturer.

BRIEF SUMMARY OF THE INVENTION

Therefore, it is an object of the present invention to provide a program component system with especially flexible and far reaching expandability. In particular, the functionality of a component should lend itself to modification and/or expansion without requiring a knowledge of the source code of the component to be expanded.

According to the invention, this object is achieved by a program flow method in a program component system having the features of claim 1 and a method for expanding the program component system having the features of claim 10.

In the following, the component to be expanded is referred to as the "basic component" while the new component to be added is referred to as the "expansion component".

The invention starts from the basic idea to achieve nearly unlimited expandability of the basic component by giving up the requirement of an expansion interface in the basic component to be defined by the programmer. Rather, the manufacturer of the expansion component defines how the expansion component is supposed to interact with the basic component. This basic idea constitutes an inversion of the traditional principles in computer science (encapsulation, information hiding, . . . ). Surprisingly, however, this very abandonment of established principles enables even non-programmers to implement relatively large software systems in an amazingly short time.

The reasoning according to the invention of having the programmer of the expansion component rather than the programmer of the basic component define the expansion interfaces, involves a reversal of used patterns of thinking during the program flow as well as during the introduction of an expansion component into an existing program component system. These two cases are the subject matter of independent claims 1 and 10.

In the course of the program flow, components usually need data from each other in order to process them and to generate results. It is known to provide a called procedure with data from the calling location and to return the results upon reentry (return jump). However, this method requires the calling interface to be predefined by the programmer of the calling procedure.

In contrast, the invention provides for the called component to fetch/acquire the required data itself—using a suitable running time system. This process will be called "data acquisition" from now on. In the component from which data are to be acquired, there is no need for special interfaces previously defined by the programmer. Accordingly, it is the called component's job to store the results into suitable locations of other components. This process will be called "data disposal". Also in this case, it is not necessary that the programmer has provided special interfaces for data disposal. In this context, the mere definition or declaration of a data field or a variable (if necessary including a type specification and further parameters) is not to be regarded as an "interface". In contrast, an interface would be for example procedural instructions that have to be explicitly introduced into a component script by the programmer in order to start or enable a data transfer at the appropriate running time.

When attaching an expansion component to an existing program component system the known principles are reversed correspondingly. Normally it would be expected that the previous components of the program component system remain unchanged by the expansion. In contrast, the invention provides that docking points for the expansion component are searched for in the program component system and that those components of the program component system in which at least one docking point was found are changed by inserting calling information for the new component at each docking point that was found. Thus, each component of the entire program component system is potentially modified.

The solution according to the invention enables the execution of far reaching expansions of the functionality of a program component system without having the programmer of the previous components already plan, provide or preconceive such possibilities. This constitutes a substantial progress vis-a-vis previously known program component systems.

In the wording of the present application, the term "running time system" is meant to cover all generic routines, i.e. routines which are not explicitly given by the programmer of a component. Here, the running time system may also comprise portions included in the components. For example, the portion of the running time system carrying out the data transfer may be shifted into the individual components.

The data transmitted during data acquisition and data disposal are preferably not generally accessible, but are associated to the component from which the data are acquired or into which the data are disposed. These data are transferred in preferred embodiments while the named component is inactive. In particular, this component may be transferred from the regular working memory to an external location at the time of data acquisition and data disposal. Preferably local and/or non-persistent data, and thus, no globally available data in particular are transmitted when data are acquired and/or disposed.

Preferably, data acquisition and/or data disposal are carried out without cooperation of the component from which the data are acquired or into which the data are disposed. For example, it can be provided that only the disposing component and the running time system will be contributing during a data disposal. In preferred embodiments, the component into which the data are archived has no way of influencing.

Preferably, when executing a component, the data fields required for data disposal are put on a list. In particular, this can be data fields the contents of which has been determined by data acquisition and to which a write acces has been carried out.

Desirably, it is further provided for a called component to be able to directly acces by reading or writing data fields defined and/or available in the calling component. This allows a quasi interface-free data transfer between the above two components. The call of a component is preferably triggered by call information or a call message included in a docking point of the calling component. The use of docking points being able to accept call information provides a particularly flexible expansion of functionality.

Desirably, all interaction interfaces of a component are predefined as potential docking points. Such interaction interfaces may be interaction screen fields such as input fields or switch panels. In addition, all output fields of a print mask and/or all access operations on persistent data (for example opening, reading, and writing of a file or a data base) may be provided as interaction interfaces. In preferred embodiments, interaction interfaces may also be predetermined by the programmer of a component.

Preferably, when inserting a further component into the program component system, all possible docking points are automatically identified (without knowing the source codes of the already existing components). Therefore, it is possible to carry out an expansion with little programming effort. Further, appropriate call information is desirably entered into at least one docking point.

In preferred embodiments, the method for component expansion includes a further step of generating at least one component as a binary object. In particular, exactly one or a maximum of one binary objects can be generated for each docking point that has been found. In this binary object, the memory allocation of the program component system can be taken into consideration at a later program execution time.

Further preferred embodiments are the subject matter of the sub-claims.

For a better understanding of the present invention, an embodiment of the invention and several modifications thereof are discussed in more detail with reference to the schematic drawings.

DETAILED DESCRIPTION OF THE INVENTION

Figure 1:
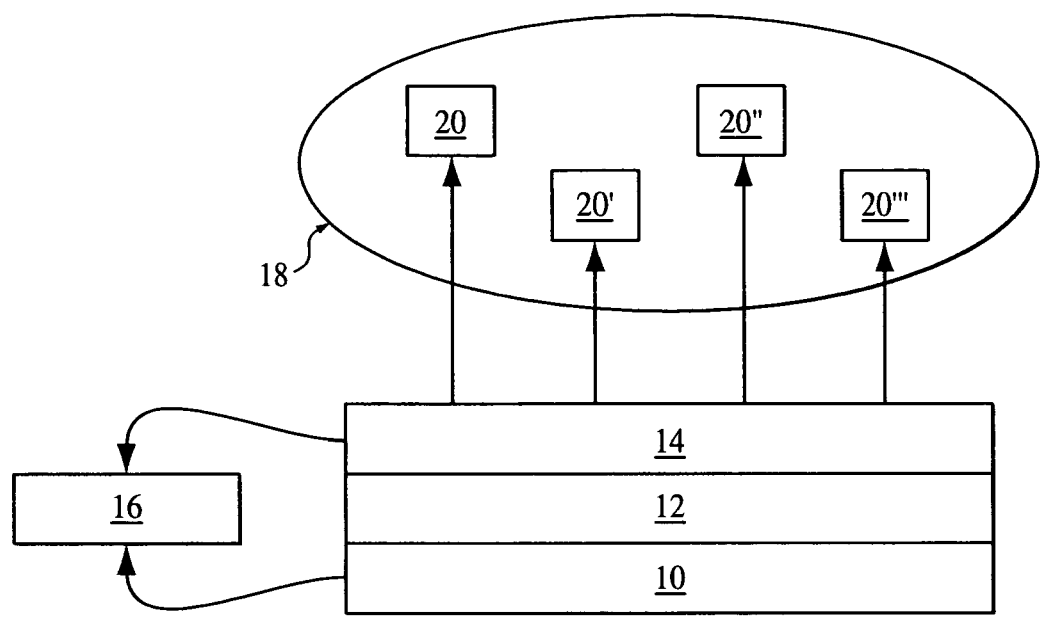
FIG. 1 shows a principle presentation of the program component system during program execution.

Referring to FIG. 1, the structure of the program component system during the time of execution is illustrated. An operating system 10 such as a conventional windows operating system has been expanded by a distribution platform 12 such as DCOM or CORBA. On this distribution platform 12 a running time system 14 is based which is also referred to as "middleware". The operating system 10 provides a working memory region 16 which is managed and used by the running time system 14. In one embodiment the distribution platform 12 has been omitted and the running time system 14 is immediately based on the operating system 10. The program component system is executed by a commercially available computer such as a PC-compatible computer.

Besides the running time system 14 the program component system comprises a container environment 18 including several components 20, 20', 20", 20''' in the form of binary objects. The components 20, 20', 20", 20''' determine the behavior of the program component system. The are called—for example as a function of actions caused by the user—by the running time system 14.

Figure 2:
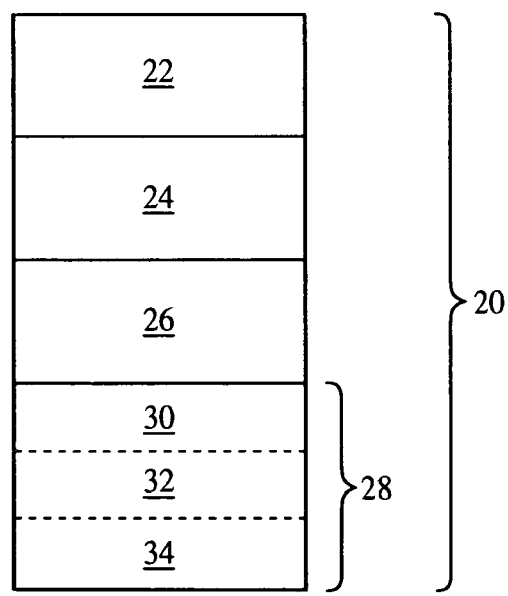
FIG. 2 shows a principle presentation of a binary object.

As illustrated in FIG. 2, one component 20 in the binary object format comprises several portions, i.e. one program portion 22, one table portion 24, one directory portion 26 and one memory image portion 28.

The program portion 22 includes an interpretable code which is interpreted by the running time system 14 at the time of execution and which determines the behavior of component 20. The code included in the program portion 22 is in an intermediate format enabling the program execution time to be efficiently carried out. In some alternative embodiments a suitable compilation of the code is provided for immediate execution under the control of the operating system 10.

In the table portion 24 execution time tables for configurable properties and parameters of the code are stored. For example, this is information about window size and colors for the screen representation or information for the print representation. In addition, the execution time tables contain management information on memory allocation. The directory portion 26 contains a directory of the docking references, a memory directory, a data transfer directory and a method directory.

The memory directory contains the designations for memory fields available in the component, information on the memory fields as well as references thereto (more precisely: offset values or displacement values). The method directory contains a list of the methods provided by the component. These two directories are included in the binary code such that an expansion of the functionality of a component (component script) is possible even without any knowledge of the source code of a component. All the memory fields contained in the memory directory are accessible from arbitrary other components by the operations of data acquisition and data disposal and can be read, modified and described. In this described embodiment there is no possibility for the programmer to protect individual memory fields from unauthorized acces. Information needed for data acquisition and data disposal at the execution time is contained in the data transfer directory.

In the memory image portion 28 three contiguous data regions 30, 32, 34 are provided having boundaries given by the management information in the execution time tables. The first data region 30 will be referred to as access data region 30 below. It is reserved for those data originating from a component at a high level within the call hierarchy. These data can be immediately read, processed and written by the called component without necessitating any programmed data transfer. Within the context of a procedural programming language this is roughly equivalent to the possibility of accessing variables directly which variables are defined in a statically higher level procedure. The size of the access data region 30 will be fixed during instantiation of a component 20. This is possible because each component 20 in the binary object format is associated to exactly one possible call location (one docking point). The size of the acces data region 30 of a component 20 is the sum of the quantities of the access data region and a local data region (to be described later) of the calling component.

As a second data region in the memory image portion 28 of a component 20 the local data region 32 is provided. This data region is adjacent to the access data region 30. It contains the data which are redefined in the component 20. Such definition may be carried out directly in the component or indirectly—for example by means of a reference on a screen mask or a print format. Within the context of a procedural programming language the local data region 32 contains roughly the local variables of a procedure.

Finally, as a third data region in the memory image portion 28 a transfer data region 34 is provided. The transfer data region is reserved for intermediate storage of data which are acquired during the program execution time from another component according to the data acquisition principle and disposed into it according to the data disposal principle.

When a component 20 is instantiated, i.e. translated from a component script into at least one binary object, the access data region 30 and the transfer data region 34 need not be covered with defined values since these regions will be overwritten anyway during execution time. The local data region 32 will be filled with predetermined standard values for the individual data types. During the execution time of a program component system these three data regions 30, 32 and 34 of a component 20 are used for the intermediate storage of the current system condition each time a further component is called and for partially recovering this condition (with regard to the local data region 32 and the transfer data region 34) at a return jump.

For generating a component the programmer creates a component script which is suitable for automatic translation by means of a generator system. This translation process which is also referred to as instantiation of a component will be described below in more detail. The component script constitutes the definition of the component to be generated. It contains instruction lines which are translated as an interpretable code of the component. The programming language used is known per se and is based on object-oriented principles. In addition, the component script may contain instructions determining docking points for expansions preconceived by the examiner. Also, data and parameters may optionally be contained in a component script, for example parameters for visually representing data or an enumeration of permissible input values. Furthermore, the component script may contain instructions for calling "foreign programs". During the time of execution the corresponding program, for example a COBOL program, is then started. This program itself may now use interfaces of the program component system and, for example, start further components.

In addition, the component script may contain references to screen masks and formats to be used as well as print formats. Such screen masks or print formats are developed beforehand using an appropriate graphical tool. The tool ("GUI-Builder") generates several global directories which may be accessed during each instantiation process of a component. These are, first, a global directory of the available screen masks and print formats, second, a directory of the docking points given by these masks and formats, and, third, a directory of the labels and types of the data to be expected in the defined input fields or print fields.

If the component script is the definition of an expansion component, i.e. a component which is supposed to expand an already existing component (basic component), the component script also comprises an inheritance parameter specifying the desired docking points for the component expansion. The inheritance parameter may define more than one basic component and more than one docking point, as explained below.

The docking points may be generic locations or locations in the basic component indicated by the programmer at which locations call information for an expansion component may be inserted. The docking points of a component in the binary object format can be automatically identified such that a component expansion is possible without any knowledge of the source code of the basic component.

In the embodiment described for this case, for types of docking points are provided. First, all input fields and other operating elements (buttons, switching areas, . . . ) in the screen masks are provided as docking points accessed by the basic component. For example, this enables component expansions to be always called when the user carries out an interaction with the input field of the basic component, such as inputting a value or activating the input field or moving the mouse pointer over it. The programmer of the basic component does not necessarily have to explicitly provide for this possibility. Similarly, all print mask output fields may be used as docking points, for example such that the output values of a table to be printed may be modified.

Furthermore, all operations of the basic component on persistent data (such as data access or data base access) are provided as docking points. In this case as well, expansion components may be "connected in between" without requiring the programmer of the basic component to explicitly indicate it. Finally, as mentioned before, a component may also include docking points defined by the programmer at arbitrary locations of the program flow. Alternative embodiments may comprise additional or other docking points.

In this embodiment, each docking point comprises several docking locations ("slots"). Thus, several component expansions can be connected to one docking point. At a docking point associated to an input field, there are for example one main docking location and five sub docking locations. A component expansion which is entered into the main docking location will always be called when the user activates the input field. Optionally, this component can already be called each time while the input field is displayed, i.e. before a user action. In contrast, the sub docking locations may be associated for example to the operation of certain function keys or other actions of the user. In the case of print mask output fields the control of the docking locations of a docking point may be determined for example by a user input at the starting time of the printing process. In alternative embodiments other call strategies or other numbers of docking locations (for example only one per docking point) are possible.

Figure 3:
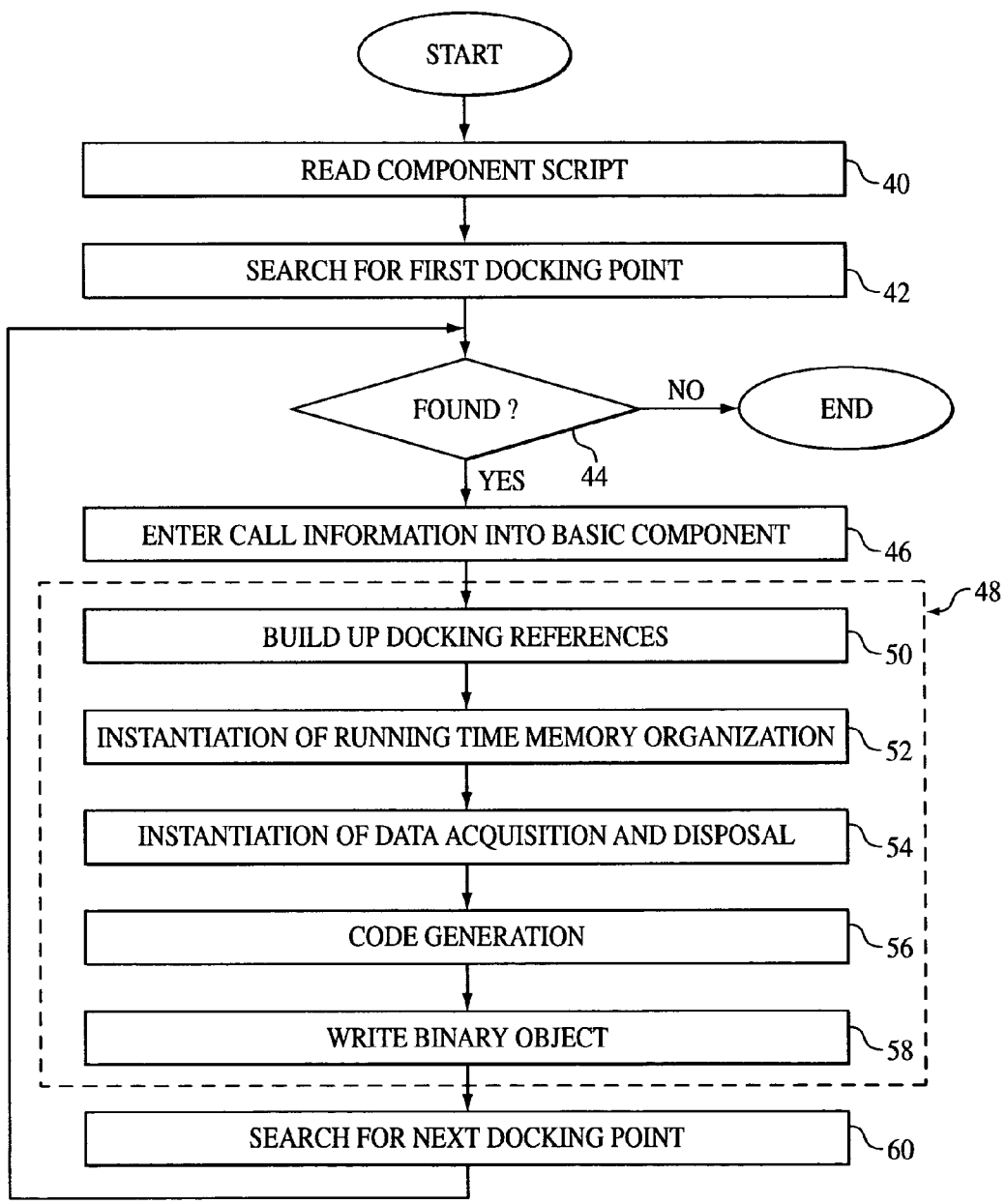
FIG. 3 shows a flow chart of the instantiation of components.

Referring to FIG. 3 below, the instantiation of components is described in more detail. As mentioned above, "instantiation" means translation of a component script into at least one binary object. In the present embodiment, exactly one component as a binary object is generated for each docking point found.

The instantiation process which is automatically carried out by the generator system starts with reading the component script (step 40). In step 42 a first docking point is searched for. If the component script to be translated includes only the container identification as an inheritance parameter, a generic docking point in the container environment 18 (FIG. 1) is assumed. This permits instantiation of "root components", i.e. components which do not constitute any component expansions.

However, if the component script to be translated includes a "real" inheritance parameter, this parameter will define the docking points provided for the component expansion. To this end, several possibilities exist. For example, if an input field of a screen mask is to serve as a docking point, the inheritance parameter may indicate both the field name and the desired docking location within the docking point (the number of the "slot" besides specifying the basic component. As an alternative, it is also possible to only enter the field name and if necessary the number of the "slot" into the inheritance parameter. As a docking point, all locations in the binary objects currently available in the program component system are then used, at which binary objects a screen format using the the above field as an input field is referenced.

When a first docking point has been found (inquiry 44), suitable call information such as a "message" serving to call the expansion component is first entered into the basic component containing the docking point (step 46). To this end, the basic component is read in its binary format, the reference to the expansion component is entered into the basic component, and the binary object thus modified will be rewritten into the program component system. In doing this, the inheritance parameter determines at which docking location ("slot") within a docking point the call information is to be entered and which user action is supposed to result in calling the expansion component.

After modifying the basic component including the docking point which has been found, the expansion component associated to this docking point is built up as a binary object (box 48). First, the docking points of the expansion component are determined and entered into the corresponding directory in the directory portion 26 of the component 30 (step 50). To this end, all screen masks and print formats referenced by the script of the expansion component are examined. In addition, the global directory of the docking points defined by these masks and formats is accessed. The information contained therein is imported as docking references into the directory portion 26. Besides the name of an integrated screen field or print field, this may be information about the type of field, the memory space requirements of the associated data value etc.

In addition, the component script is searched for docking references indicated by the programmer (construction: INTERFACE-IS <name>). These docking references are also adopted by the directory portion 26. Finally, for all access operations on persistent data found in the component script (construction: for example READ <name of entity>) the corresponding docking references are adopted into the directory portion 26.

In a consecutive step 52, the running time memory organisation is instantiated. To this end, the field names in the screen masks and print formats referenced by the expansion component are first determined, which field names have not yet been defined in the basic component. Unless they do not correspond to entries in the access data region 30, these field names are regarded as local variables of the expansion component. All field names are entered into the memory directory in the directory portion 26. In addition, a transfer list is established in order to transfer the screen data and print data from a buffer memory into the memory region of the expansion component (access data region 30 or local data region 32 or transfer data region 34) during the time of execution. This function is automatically carried out at the time of execution without requiring any explicit programming.

As a further part of step 52 the statical memory definitions in the component script are now processed. As the basic component is unequivocally given, the sizes of the three data regions 30, 32, 34 of the binary object 20 can be already determined at the time of instantiation. In addition, the memory directory in the directory portion 26 can be completely established.

First, all statical memory definitions (construction: INHERIT-DATA <name>) in the component script which are already defined in the basic component are searched for. At the time of execution the corresponding data values are located in the access data region 30 at the same location (the same offset or displacement value) as in the basic component, since the working memory region 16 occupied by the access data region 30 of the basic component will still be used when the expansion component is called. Therefore, entries corresponding to the ones of the basic component are received in the memory directory. These entries include the name and the type of the data value as well as the field length and the displacement value.

Finally, the statical memory definitions of the component script are processed which are associated to the local data region 32. These are, first, definitions of memory fields not defined in the basic component and, second, memory definitions where a local storage has been expressly given (construction: INHERIT-DATA-LOCAL <name>). For such memory definitions a free address in the local memory region 32 is determined and reserved. More precisely, the next available (free) address with regard to the current memory level is used (which depends on the memory occupancy of the basic component and may also depend on local fields of the expansion component which have already been assigned). For these memory definitions as well, corresponding entries into the memory directory of the expansion component are received.

In the next step 54, the data acquisition and data disposal of the expansion component occurring at the time of execution are instantiated by establishing the data transfer memory in the memory portion 26. To this end, the data acquisition and data disposal definitions in the component script are searched for. These definitions have the following form, with "INH" representing "inherit" and "IME" representing "import/export":

```
INH-DATA-IME <identification of the component with which data
              acquisition and data disposal takes place>
    INTERFACE = <field name 1>,
                <field name 2>,
                ...,
                <field name n>
    ENDTRANSFER
```

When such a definition is found, the memory directory of the addressed component is evaluated. Information about the data fields to be exchanged (field type, field length, address or displacement) in the working memory region 16 at the time of execution are entered. In addition a corresponding memory field is reserved in the transfer data region 34, provided the addressed field is not included in the access data region 30. From this information a corresponding entry in the data transfer directory of the directory portion 26 of the expansion component is generated. This entry thus includes the allocation of the memory field of the addressed component to the memory field in the transfer data region 34 of the currently instantiated component. The addressed component need not be the basic component, and the addressed memory field in this component may be located in one of the three regions 30, 32, 34. Thus, data acquisition and data disposal of all data available in any other component is possible.

Now, the code generation (step 56) takes place, in which the instruction lines in the component script are transferred into a suitable intermediate code which can be interpreted by the running time system 14. The code generation is carried out using principles known per se. The component is now tied together in the binary object format from the components which have been generated in the steps thus far described. The resulting binary object has the structure shown in FIG. 2 and the structure which has already been described above. It will be stored in a further step (step 58).

Thus, the generation of a binary object for the docking point is completed. In the instantiation procedure a subsequent docking point is now searched for (step 60). If such docking point is present in the program component system, a further binary object is generated; otherwise, the instantiation is finished. At the most, the binary objects generated from a component script are different from each other with regard to the memory occupancy defined in the memory directory. If several docking points are found in a basic component, this memory occupancy, however, is usually identical. This case may also occur if several docking points are found in different basic components. Thus, one alternative embodiment provides for optimization to generate each binary object only once.

In order to execute the program component system the structure represented in FIG. 1 is built up. To this end, the running time system 14 and the container environment 18 are first loaded and started. The container environment 18 includes a catalog of the menu entries visible during loading. This catalog is defined by the components 18. Now, a root component is started which has been generated by the generator system itself during the above instantiation process. The running time system now waits for an action caused by the user, such as a menu selection, indicating the call of the "actual" component of the program component system.

Figure 4A:
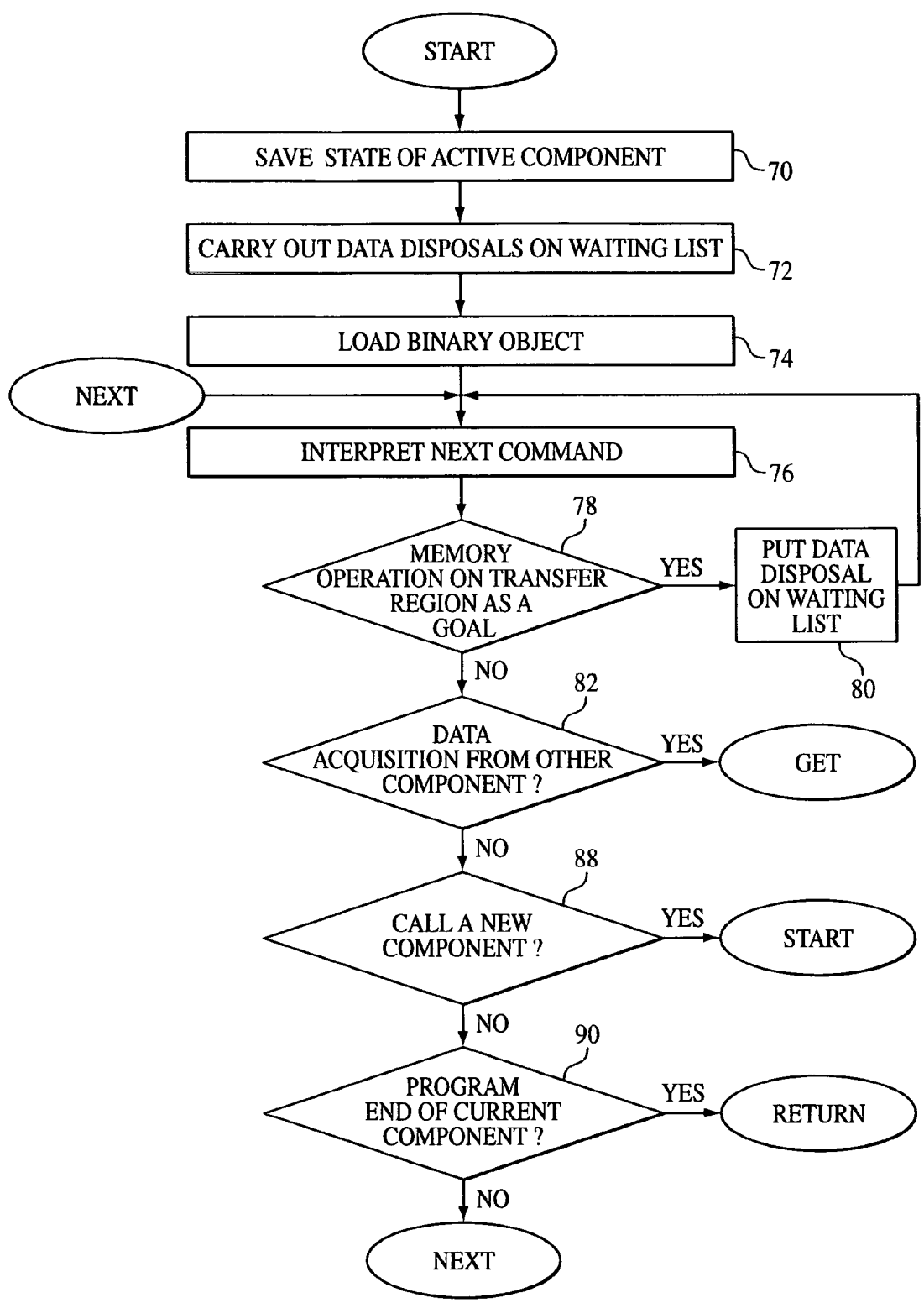
FIGS. 4a–4c show a flow chart of the course of computing at the time of execution including a change of component.
Figure 4B:
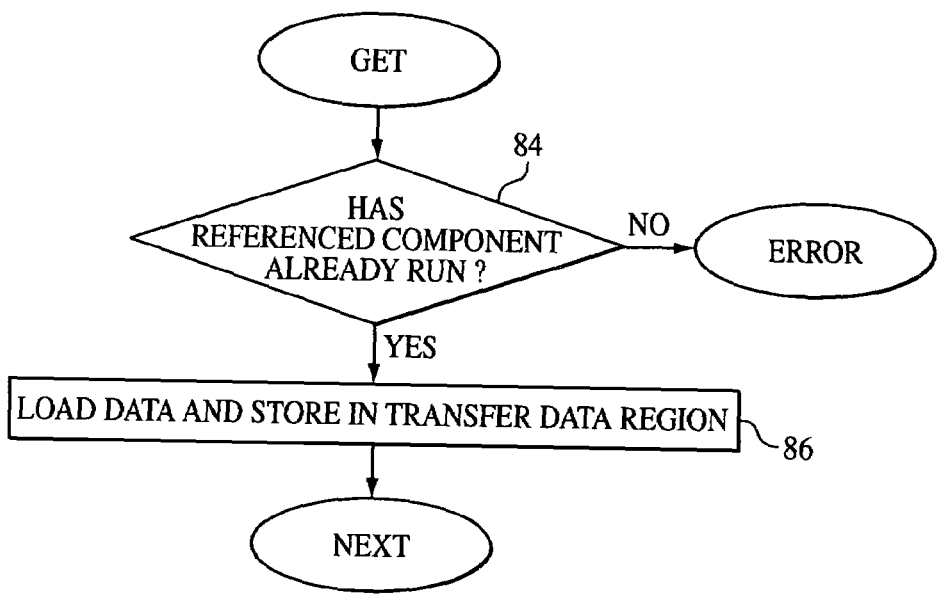
Figure 4C:
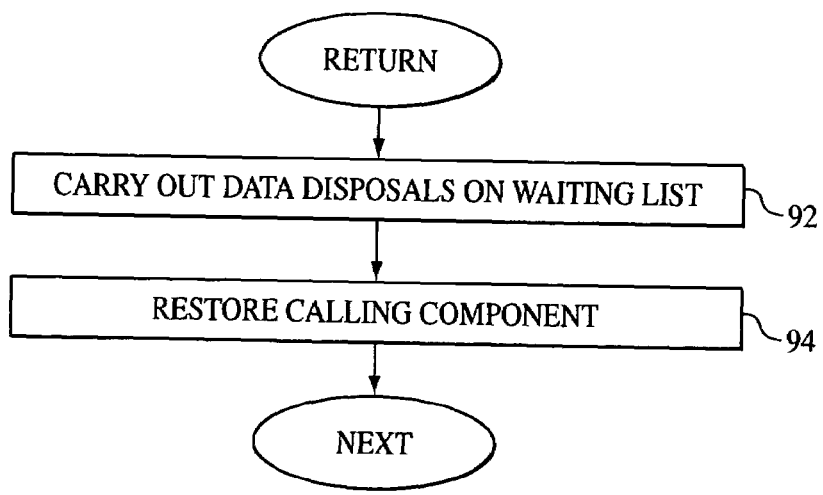

In FIGS. 4a to 4c the program flow method is shown, which is carried out during the calling of the component as well as during the execution of the called component. In the present embodiment, exactly one component is always active at the running time. Immediately after the system start, this is the root component described above. Only each active component is located in the working memory region 16. This component has the binary object structure shown in FIG. 2. In alternative embodiments a quasi-parallel program run procedure is also possible (for example by "multi-threading"). The control is then carried out by the underlying operating system 10.

If a new component is to be called, for example in response to an input or an action of the user, the state of the component being active is saved (step 70). This means at least that a part of the working memory region 16 is transferred into a file or any other saving region, in which part the memory image region 28 of the component is located. In the present embodiment, even the entire binary object is saved since its remaining portions are not significant with respect to memory space requirements.

In addition, all data disposal processes are carried out, which processes have been put on a waiting list during the program run procedure of the component which has been active (step 72). In order to increase efficiency, the present embodiment provides for only those memory fields of the transfer data region 34 which have been writingly accessed, to be re-transferred from the current component into the component referenced by the data disposal. In alternative embodiments, no waiting list of the changed data is prepared; rather, during each change of component, all data fields in the transfer data region 34 are transferred to each of the referenced components.

In each data disposal process the data transfer directory of the current component is resorted to, in order to determine the referenced component(s) and the corresponding data field(s) in the memory image portion(s) 28 thereof and to transfer the data thereto. Each data disposal thus changes a binary object of a component currently not active. During the running time, a component may have been called and partially executed several times. In this case, several versions of the component are saved and the data are disposed into the saved component version which, within the call chain leading to the currently active component, is closest to this component. In alternative embodiments, a different selection or a selection determined by the programmer, of the component version to be used is made.

Next, in step 74, the last-called new component is loaded into the working memory region 16 as a binary object. When this is done, the part of the working memory region 16 which has been used for the program, table and directory portions 22, 24, 26 of the old component, will be overwritten at any case.

Also, the local data region 32 of the memory image portion 28 of the new component will be loaded into the working memory region 16. Thus, at the start of the new component, all local data are pre-occupied with defined standard values. However, the portion of the working memory region 16 which corresponds to the access data region 30 of the called component, will not be overwritten. Thus, the data values stored thereat are not lost when components are exchanged. Rather, the new component can directly access memory fields defined in the calling component, via the access data region 30. The size of the access data region 30 is determined by the memory distribution found out during the instantiation phase. If the calling component accesses values completely different from the ones of the called component, the access data region 30 has zero size.

After the called component has been loaded as a binary object, the code included in the program portion 22 will be interpreted command by command. When executing a command (step 76) some special cases have to be taken into consideration.

If the command is a memory operation aiming at the transfer data region 34 (inquiry 78), the memory field in question will be put on a waiting list for later data disposal (step 80). Such putting on a waiting list is also possible by an explicit command.

If the current command is an instruction causing data acquisition from a referenced component (inquiry 82), the steps shown in FIG. 4b are carried out. Such command may be for example the above-described construction INH-DATA-IME which, in the present embodiment, is considered both as a declaration of a data acquisition and a data disposal relationship as well as an instruction for data acquisition. In alternative embodiments, all data referenced by a component are already acquired from the very beginning of this component.

In the data acquisition method of FIG. 4b it is first examined whether the referenced component has already been (at least partially) carried out (inquiry 84). If this is not the case, no valid data can be acquired and a running time error will be triggered. In contrast, if a saved version of the referenced component is available, the required data are loaded from it and written into the transfer data region 34 of the currently active component. Each of the memory locations in the referenced and in the active component can be seen from the data transfer directory of the active component. In this case (similar to step 72) it is possible that several versions of the referenced component are memorized. The version which has been carried out last in the call chain leading to the active component will then be used for data acquisition. In alternative embodiments, other given or programmed selection strategies are possible. After the end of the data acquisition the program flow will be continued at step 76 (FIG. 4a).

In inquiry 88 (FIG. 4a) it is examined whether the currently interpreted command is a command for exchanging components. i.e. for calling a new component. In particular, such command may be call information (a message) stored in a docking point. As described above, such call information results in calling the component indicated in the call information in response to the type of the docking point, either by its mere presence or during a predetermined action of the user. If such a call takes place, the current command counter level is stored in a stack storage and a new instance of the method illustrated in FIG. 4a is started.

Finally, inquiry 90 is related to the case where the execution of the current component is terminated in a regular manner. If this is not the case, the programm execution will be continued with step 76. In contrast, if the program end has been reached the method illustrated in FIG. 4c will be carried out. Similar to step 72, all data disposals that have been put on a waiting list are carried out (step 92).

Then, the state of the component in the working memory region 16 which has called the current component (step 94) is restored. This concerns the portions 22, 24 and 26 as well as the local data region 32. However, the portion of the working memory region 16 corresponding to the access data region 30 of the calling component is not restored such that a return of values in the access data region 30 from the current component to the calling component is possible.

After the calling component has been restored, the present instance of the method illustrated in FIGS. 4a to 4c is terminated. The program execution will be continued in the former instance at the location where the original component call has been triggered (step 76).

Using the above-described methods, an expansion of functionality of components is possible in a relatively easy manner. For example, a basic component is given which carries out a method of determining prices based on a single price to be entered by the user (via an input field). Using a suitable expansion component, this basic component can be expanded by an application-specific method of determining price for the single price. To this end, the call information for the expansion component is written into a docking point associated to the input field for the single price. The single price determined by the expansion component is written into the basic component by the data disposal method. Additional data values the expansion component needs for determining price are called by the data acquisition method from other components. It is not necessary for such expansion of functionality to be taken into account during the programming of the basic component or the other components.

The programming of larger software systems can be simplified in different ways. For example, it is possible to define what is referred to as "adapter components". An adapter component is an expansion component directly referencing another component. Thus, the other component can be used several times under different names.

The invention claimed is:

1. A program flow method in a program component system, the program component system comprising a running time system and several components each having a program portion, said method comprising the steps of:
   a) triggering a call of a called first component of said several components by call information disposed in a docking point of a calling second component of said several components and
   the following steps that are performed after said called first component has been called and during the execution of the program portion of said called first component:
   b) acquiring for said called first component, by means of the running time system, first data from said calling second component without any need for programmer-defined interfaces in said calling second component, wherein the source of the first data to be acquired within said calling second component is selected according to a definition of said called first component; and
   c) disposing, from said called first component, by means of the running time system, second data into said calling second component without any need for programmer-defined interfaces in said calling second component, wherein a target to which said second data is deposited within said calling second component is selected according to a definition of the called first component.

2. The method according to claim 1, characterized in that the first data transmitted during said acquiring are transferred from a memory image portion of said calling second component into a transfer data region of said called first component, and/or that the second data transmitted during said disposing are transferred from a transfer data region of said called first component into a memory image portion of said calling second component.

3. The method according to claim 1, characterized in that said acquiring and/or said disposing is carried out without the cooperation of said calling second component.

4. The method according to claim 1, characterized in that said calling second component is inactive during said acquiring and/or said disposing.

5. The method according to claim 2, characterized in that said transfer data region of said calling second component is located in a saving region during said acquiring and said disposing.

6. The method according to claim 1, characterized in that local and/or non-persistent data of said calling second component are transmitted during said acquiring and/or said disposing.

7. The method according to claim 1, characterized in that during the execution of the program portion of said called first component a waiting list is made indicating which of the data of said called first component require disposing.

8. The method according to claim 1, characterized in that a called component can directly access an access data region comprising the data fields defined and/or available in a calling component.

9. A method of expanding a program component system comprising several components by a further component, said method comprising the steps of:
  a) searching for docking points for said further component in said program component system, which docking points correspond to an inheritance parameter determined by a definition of said further component; and
  b) modifying each of said several components of the program component system in which at least one docking point was found by entering call information at each docking point found, said call information indicating said further component, wherein said expansion of said program component system is completed without any need for programmer-defined expansion interfaces in said several components.

10. The method according to claim 9, characterized in that all interaction interfaces of said several components are predefined as potential docking points.

11. The method according to claim 9, characterized in that all interaction screen fields referenced by said several components and/or all print mask output fields and/or all access operations on persistent data are predefined as potential docking points.

12. The method according to claim 9, characterized in that said entering call information at each docking point a call of the further component from each of said several components into which said call information was entered.

13. The method according to claim 9, characterized by additionally:
  c) generating at least one binary object from the definition of the further component.

14. The method according to claim 13, characterized in that a maximum of one binary object is generated for each docking point that has been found.

15. The method according to claim 14, characterized in that while generating each binary object, the memory allocation is considered in the one component of the program component system which includes the underlying docking point.

* * * * *